June 20, 1967 R. C. VAN SICKLE ET AL 3,327,082
BLAST-VALVE MECHANISM AND ACCELERATING TORSION BAR
ASSEMBLAGE FOR COMPRESSED-GAS CIRCUIT INTERRUPTERS
Filed June 12, 1964 10 Sheets-Sheet 1

WITNESSES:
John G. Chopp
James F. Young

INVENTORS
Roswell C. VanSickle, Russell N. Yeckley
and Wayne S. Aspey
BY
Willard R. Crout
ATTORNEY June 20, 1967 R. C. VAN SICKLE ET AL 3,327,082

BLAST-VALVE MECHANISM AND ACCELERATING TORSION BAR ASSEMBLAGE FOR COMPRESSED-GAS CIRCUIT INTERRUPTERS

Filed June 12, 1964 10 Sheets-Sheet 3

June 20, 1967 R. C. VAN SICKLE ET AL 3,327,082

BLAST-VALVE MECHANISM AND ACCELERATING TORSION BAR ASSEMBLAGE FOR COMPRESSED-GAS CIRCUIT INTERRUPTERS

Filed June 12, 1964 10 Sheets-Sheet 4

June 20, 1967 R. C. VAN SICKLE ET AL 3,327,082

BLAST-VALVE MECHANISM AND ACCELERATING TORSION BAR ASSEMBLAGE FOR COMPRESSED-GAS CIRCUIT INTERRUPTERS

Filed June 12, 1964

10 Sheets-Sheet 6

3,327,082
BLAST-VALVE MECHANISM AND ACCELERATING TORSION BAR ASSEMBLAGE FOR COMPRESSED-GAS CIRCUIT INTERRUPTERS

Roswell C. Van Sickle, Wilkinsburg, and Wayne S. Aspey and Russell N. Yeckley, Monroeville, Pa., assignors to Westinghouse Electric Corporation, Pittsburgh, Pa., a corporation of Pennsylvania Filed June 12, 1964, Ser. No. 374,709
18 Claims. (Cl. 200—148)

This invention relates generally to compressed-gas circuit interrupters and, more particularly, to improved and highly-efficient compressed-gas circuit interrupters suitable for use over a wide voltage and current range.

A general object of the present invention is the provision of an improved compressed-gas circuit interrupter adaptable for high-speed operation, and suitable for multiple-series use in the higher-voltage ranges.

Another object of the present invention is the provision of an improved accelerating spring assemblage for a high-voltage line of compressed-gas circuit interrupters.

Still a further object of the present invention is the provision of a high-speed compressed-gas circuit interrupter of the type utilizing two breaks in series, in which the inertia of the rotating, or moving parts is maintained at a minimum.

Another object of the present invention is the provision of an improved compressed-gas circuit interrupter utilizing a highly-efficient blast-valve mechanism, the latter being disposed at a highly strategic location relative to the two interrupting units to result in a minimum of elapsed time prior to the ejection of a blast of arc-extinguishing gas into the region between the separated contact structure during the opening operation.

Still a further object of the present invention is the provision of an improved compressed-gas circuit interrupter of the rotating cross-arm type in which the rotating hub assembly has associated therewith a novel blast-valve mechanism.

Still a further object of the present invention is the provision of an improved blast-valve linkage for a compressed-gas circuit interrupter, which is suitable for opening at a plurality of separate points during reclosing operations.

In U.S. patent application filed June 8, 1964, Ser. No. 373,150 by Robert G. Colclaser, Jr., and Frank L. Reese, and assigned to the assignee of the instant application, there is disclosed and described a high-voltage compressed-gas circuit interrupter in which a rotating operating-rod construction is utilized in connection with a pair of serially-related interrupting units disposed within a surrounding tank structure. In the aforesaid patent application, rotation of the operating rod not only achieves, through rotating action, separation at the contact structures of the pair of serially-related interrupting units, but, in addition, compressed gas is caused to flow through the rotating operating rod and radially outwardly through the pair of tubular movable contacts. It is a further object of the present invention to improve upon the interrupting construction set forth in the aforesaid patent application, rendering it more suitable for multiple modular used and, in addition, rendering more compact the parts associated therewith.

Further objects and advantages will readily become apparent upon reading the following specification, taken in conjunction with the drawings, in which.

Figure 1:
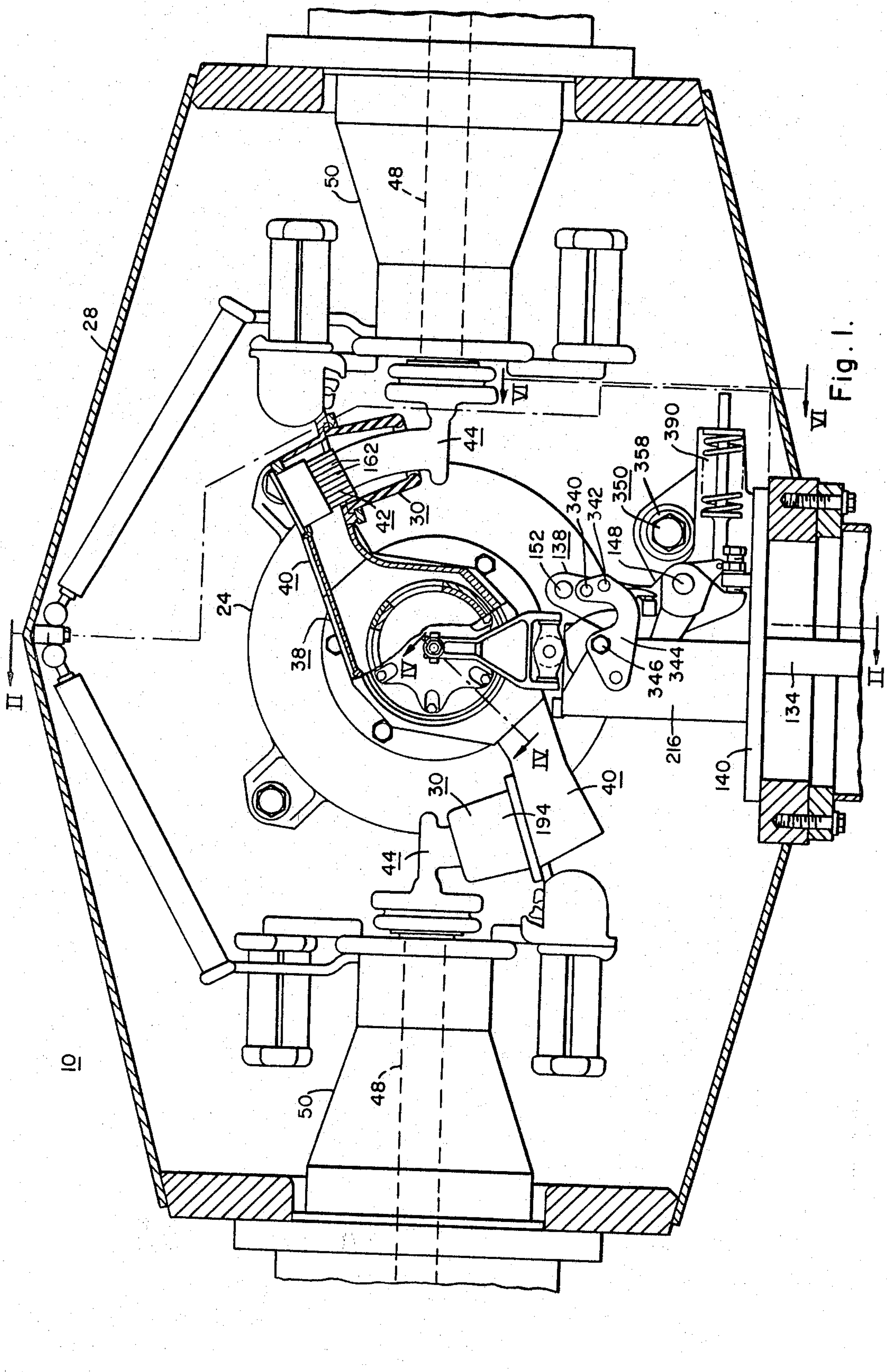
FIG. 1 is a vertical sectional view taken through a modular interrupting head of one of the pole-units of a compressed-gas circuit interrupter embodying the principles of the present invention, the view being taken substantially along the line I—I of FIG. 2, with the separable contact structure being illustrated in the closed-circuit position.
Figure 2:
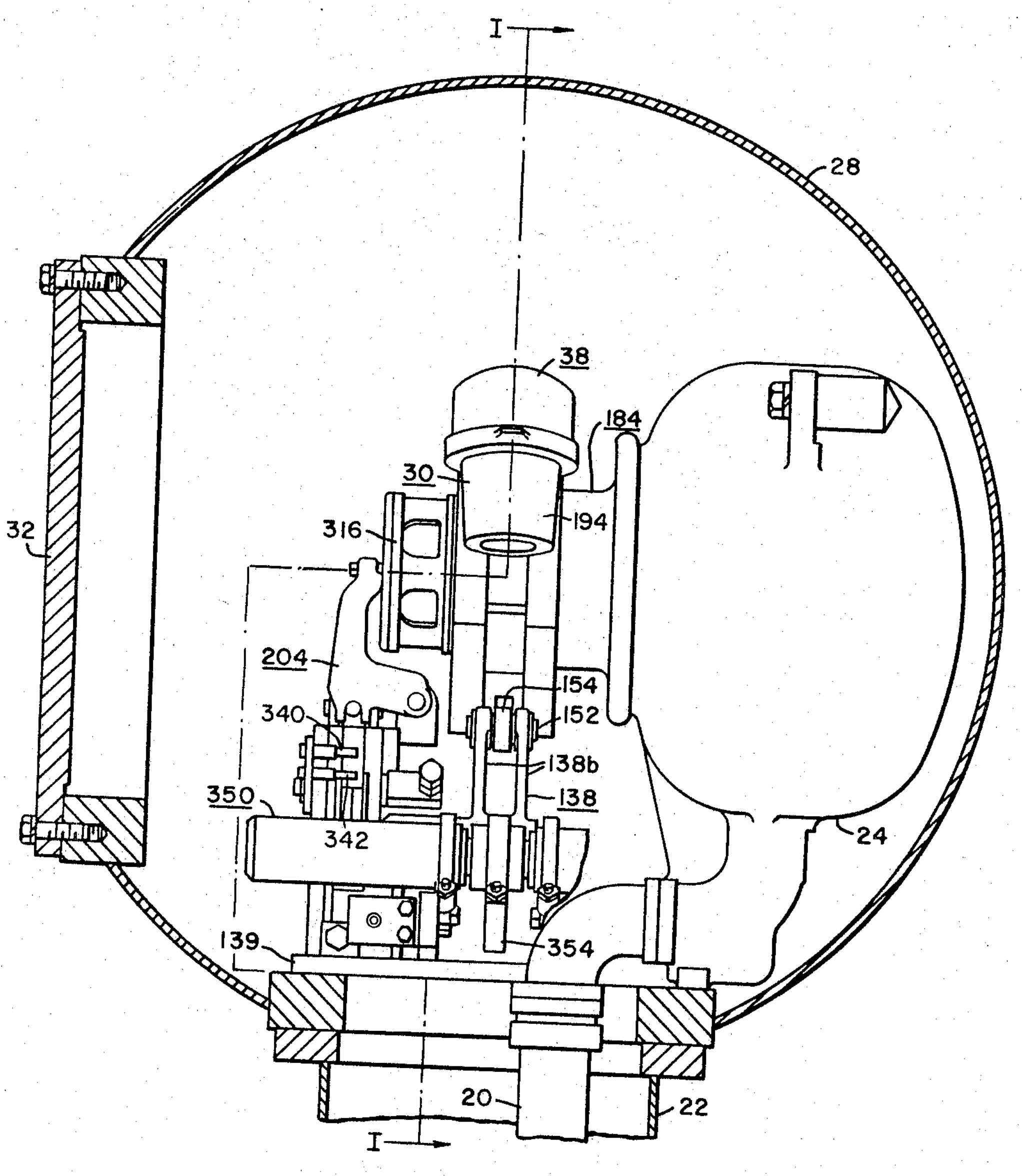
FIG. 2 is a vertical sectional view taken substantially along the line II—II of FIG. 1 with the resistor and voltage-dividing assembly omitted for clarity.

Referring to the drawings, and more particularly to FIGS. 1 and 2 thereof, surmounted upon insulating column structures 22 (FIG. 21) are live metallic exhaust housings, or interrupting head-units 28 at high potential, interiorly of each of which is a pair of serially-related arc-extinguishing units 30.

An inspection door 32 (FIG. 2), pivotally supported upon hinge pins, may be secured by bolts to form a gas-tight closure for the head-unit 28.

Figure 20:
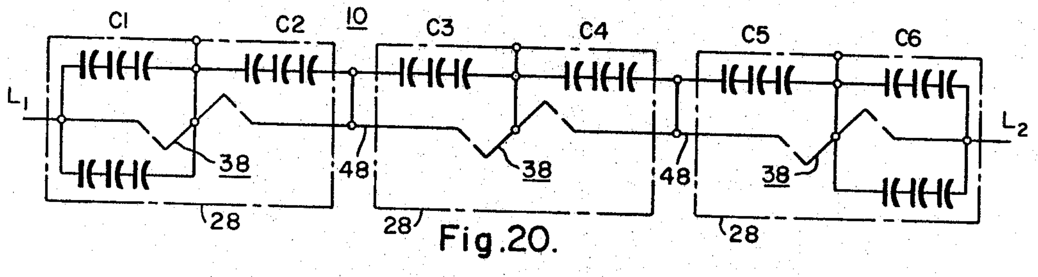
FIG. 20 is a diagrammatic view illustrating an improved voltage-dividing impedance arrangement for a multiple-break type of circuit interrupter, embodying principles of the present invention; and, FIG. 21 is a somewhat simplified diagrammatic view of the operating linkage at the base of one of the pole-units of the present invention.

With respect to FIG. 1 of the drawings, it will be noted that each interrupting head-unit 28 comprises a rotating bridging contact cross-arm assembly, generally designated by the reference numeral 38, and including a pair of radially outwardly-extending gas-conducting arms 40 carrying movable contacts 42. Each movable contact 42 separates from a relatively stationary contact structure 44 to establish an arc 46 (FIG. 3), which is extinguished by an intensive gas flow, as more fully described hereinafter. The stationary contacts 44 are supported and clamped to terminal studs 48 extending through terminal bushings 50, the latter protruding through the ends of the interrupting head-units 28. Generally, the circuit-interrupting structure 10 operates, during the opening and closing operations, so as to effect rotation of the several cross-arm assemblies 38 to consequently bring about a closing, or, alternatively, an interruption of the electrical circuit $L_1L_2$ (FIG. 20) through the circuit interrupter 10.

Figure 21:
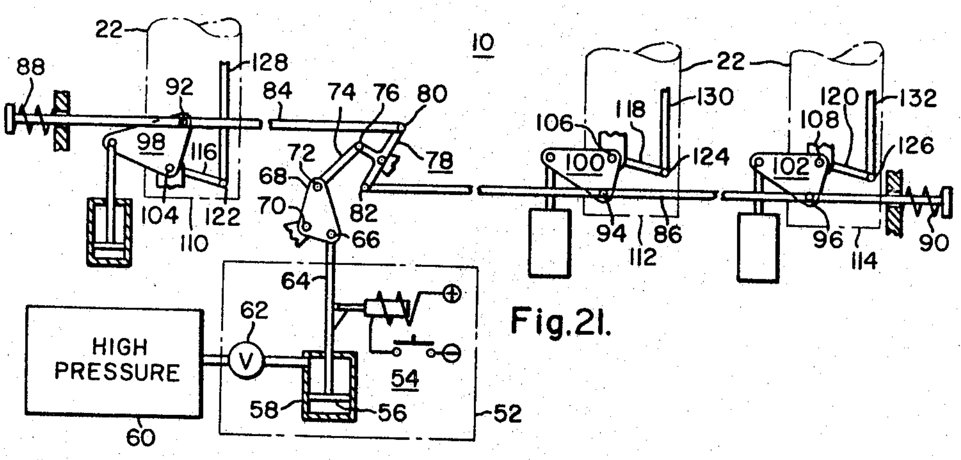

With reference to FIG. 21 of the drawings, it will be noted that there is provided a mechanism compartment 52 containing a suitable operating mechanism 54. The operating mechanism 54 constitutes no part of the present invention, and may be a hydraulic type, pneumatic type or a solenoid mechanism, as desired. The mechanism 54 is herein illustrated as of a pneumatic type comprising a pneumatic piston 56 reciprocally operable within an operating cylinder 58. The entrance of high-pressure gas, such as compressed air, for example, from a reservoir tank 60, as controlled by a closing valve 62, diagrammatically illustrated, effects downward closing movement of the pneumatic piston 56, and hence closing of the interrupter 10. Reference may be had to United States Patent 2,917,602, issued Dec. 15, 1959 to R. C. Van Sickle for a typical pneumatic mechanism adaptable for reclosing service. The operating mechanism 54 is such as to effect downward closing movement of an operating rod 64, the latter being pivotally connected, as at 66, to a main operating crank 68. The operating crank 68 is pivotally mounted upon a fixed operating shaft 70. Pivotally connected, as at 72, to this operating crank 68 is a floating link 74, which is also pivotally connected, as at 76, to a double-ended crank-arm assembly 78. The double-ended crank-arm assembly 78 is pivotally connected, as at 80 and 82, to two horizontally-extending operating rods 84 and 86. The horizontal operating rods 84, 86 have accelerating spring assemblies 88, 90 which supply energy for moving them to the open position. The horizontal operating rods 84, 86 are pivotally connected, as at 92, 94 and 96, to three crank-arms 98, 100 and 102, which are affixed to three horizontally-extending main drive shafts 104, 106 and 108. The drive shafts 104, 106 and 108 rotatably pass through gas-tight seals into lower column housings 110, 112 and 114 disposed at the lower ends of the three insulating column structures 22.

Disposed interiorly within the lower column housings 110, 112 and 114 are operating cranks 116, 118 and 120, which, in turn, are pivotally connected, as at 122, 124 and 126, to the lower ends of vertically-extending and reciprocally-moving insulating operating rods 128, 130 and 132. The upper ends of the three insulating operating rods 128, 130 and 132 have metallic rod-ends 134 (FIG. 8), which, in turn, are pivotally connected, as at 136, to main bifurcated operating lever portions **138*a*, more particularly shown in FIG. 8 of the drawings, and constituting integral portions of crank-arm assemblies, generally designated by the reference numeral 138. Each crank-arm assembly 138 has operating arm portions, more fully described hereinafter, and translates vertical reciprocal movement of the insulating operating rods 128, 130 and 132** into rotating contact motion and blast-valve operation, as more fully described hereinafter.

Figure 6:
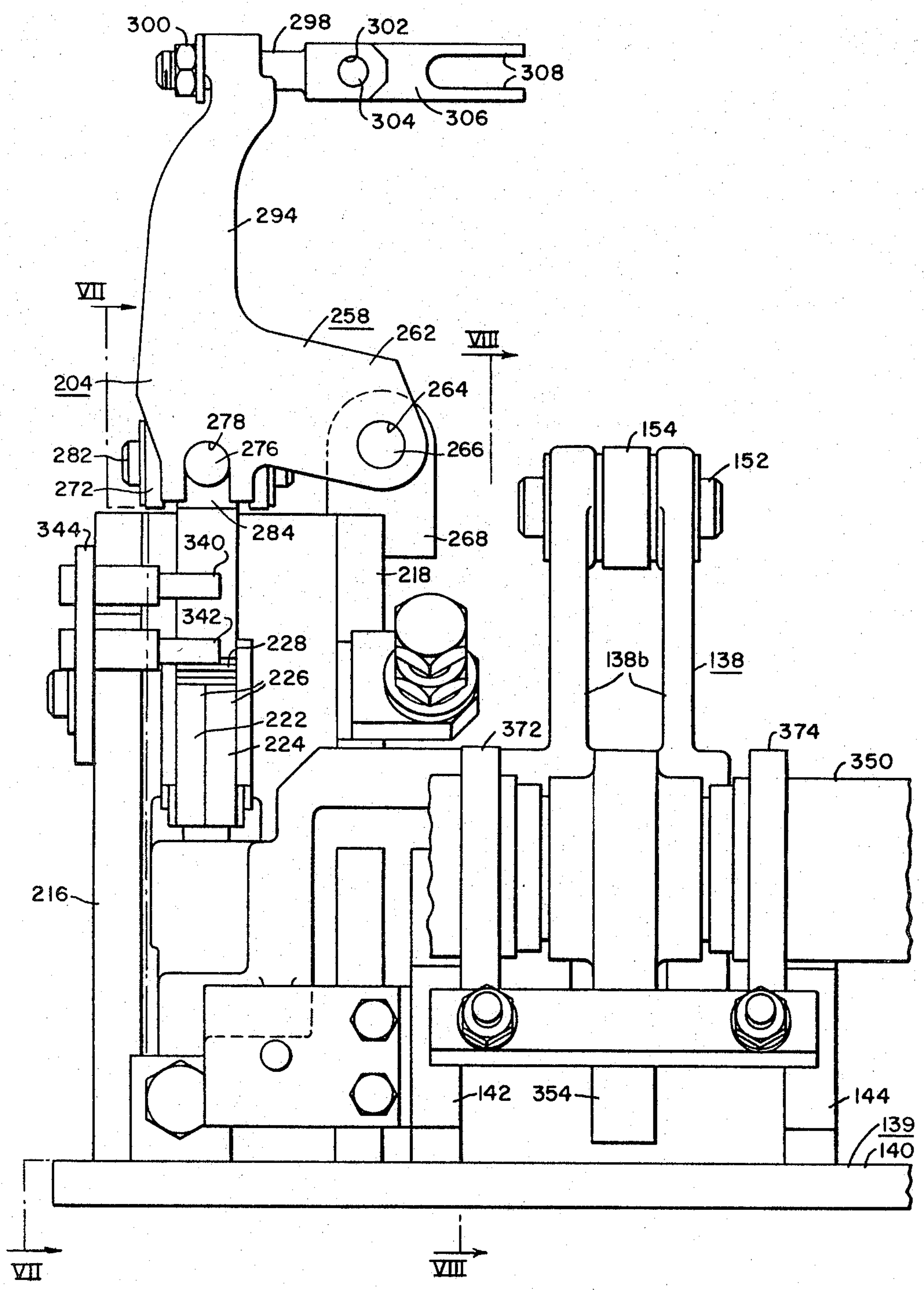
FIG. 6 is an enlarged side elevational view of a portion of the operating linkage and the blast-valve mechanism taken substantially along the line VI—VI of FIG. 1.
Figure 7:
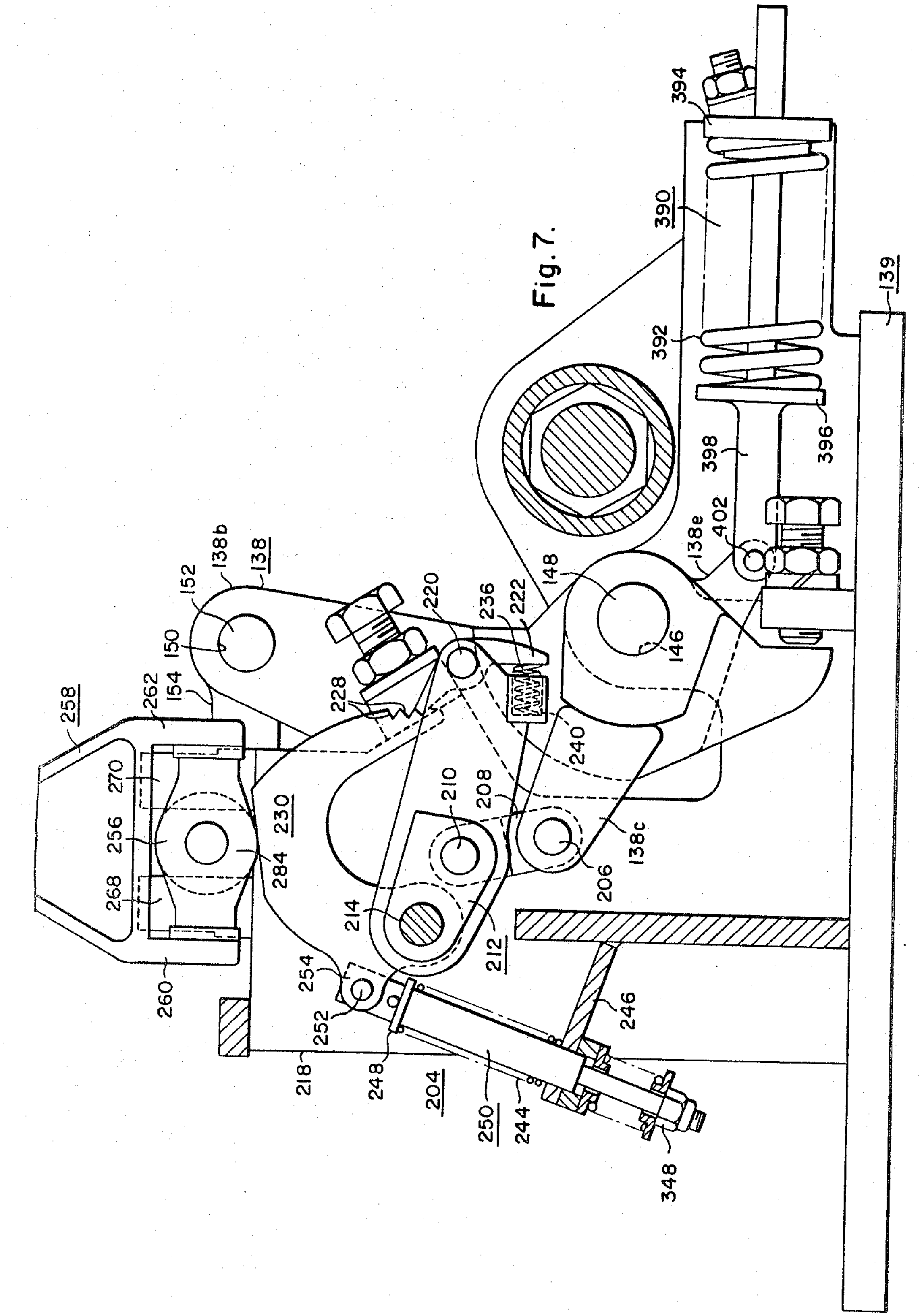
FIG. 7 is a fragmentary enlarged vertical sectional view taken through a portion of the blast-valve linkage, the view being taken substantially along the line VII—VII of FIG. 6.

Provided interiorly within each of the interrupting heads 28, and fixedly secured to it, is a stationary main frame support 139, more particularly shown in FIGS. 1, 2 and 6 of the drawings. As shown in FIG. 6, the main supporting frame 139 comprises a heavy supporting base plate 140 and upstanding supports 142, 144 rigidly fastened thereto, as by welding, to form journal portions 146 for accommodating a main operating shaft 148 (FIG. 7). The main crank-arm assembly 138, more particularly illustrated in FIGS. 6–8 of the drawings, is pivotally mounted upon the main operating shaft 148. The main crank-arm assembly 138 has a bifurcated integral arm portion **138*b* with apertures 150 extending through the outer free ends theretof to accommodate a pivot pin 152, the latter being pivotally connected to a floating link 154, which, in turn, is pivotally connected by a pin 156 (FIG. 3) extending through an off-standing bifurcated operating arm portion 158 of the bridging contact cross-arm assembly 38**.

Figure 3:
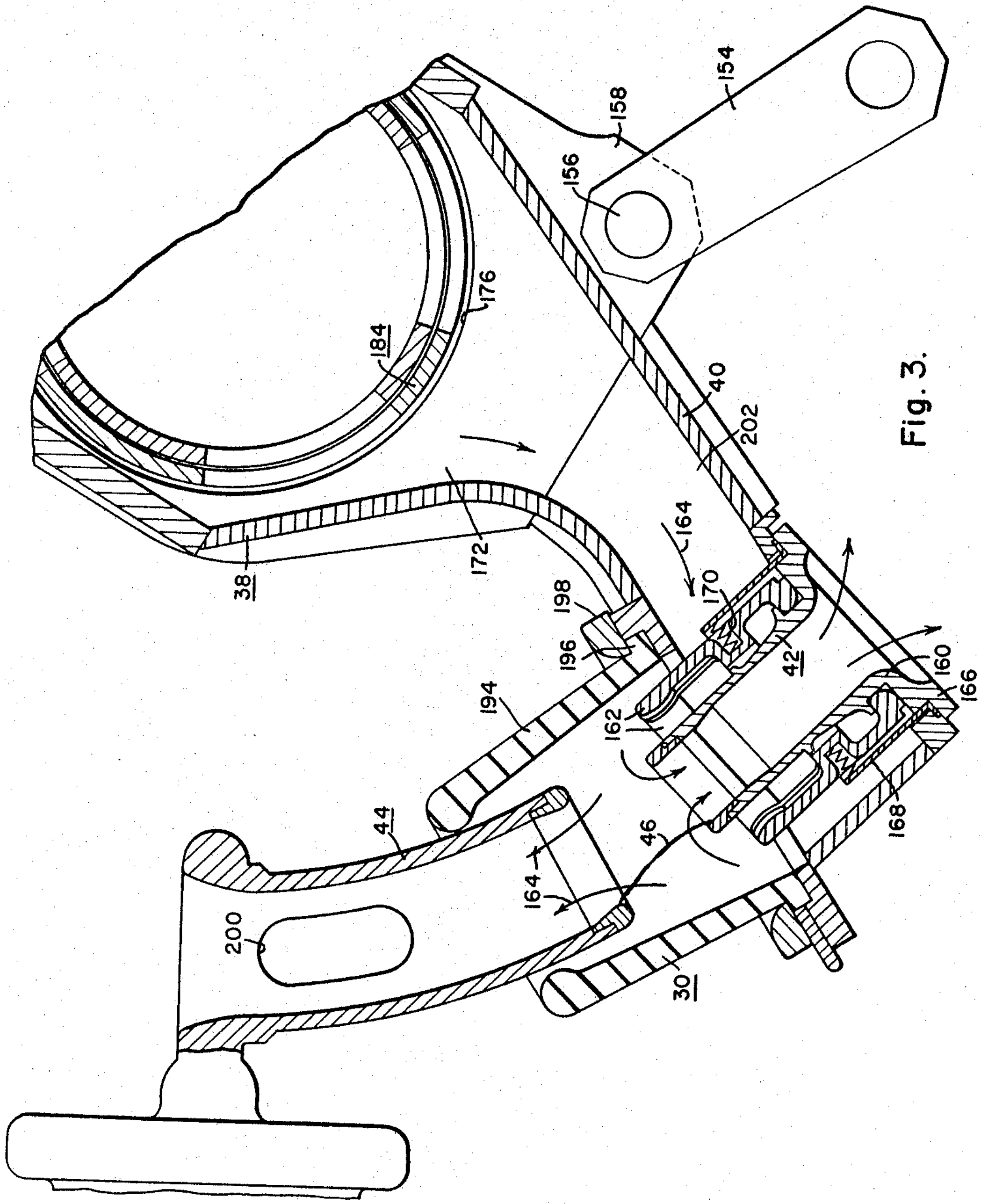
FIG. 3 is an enlarged fragmentary vertical sectional view, somewhat similar to that of FIG. 1, but showing the disposition of several detailed contact parts in the partially-open position.

With reference to FIGS. 1 and 3 of the drawings, it will be noted that each bridging contact cross-arm assembly 38 comprises the pair of radially outwardly-extending gas-conducting moving contact arms 40, to the outer free ends of which are secured the movable contact structures 42. Each movable contact structure 42 comprises a movable tubular arcing horn 160 and a plurality of surrounding circumferentially-disposed spring-biased main contact fingers 162. The main spring-biased contact fingers 162 conductively engage with the outer sides of the stationary tubular contact structure 44, more clearly illustrated in FIG. 3 of the drawings.

During the opening operation, the main contact fingers 162 are first separated from the outer sides of the tubular main stationary contact 44 to effect arc establishment 46 (FIG. 3) between the movable tubular arcing horn 160 and the stationary tubular contact 44 thereby preventing arc erosion at the main movable contact fingers 162. Arc extinction takes place as a result of a double venting blast action, as illustrated more clearly by the gas-flow arrows 164 in FIG. 3 of the drawings, and as described in more detail hereinafter. As shown, the movable contact structure 42 comprises the movable tubular arcing horn 160 having a flanged base portion 166 secured by means, not shown, to the outer extremity of the gas-conducting contact arm 40 of the contact bridging cross-arm assembly 38. In addition, a cylindrically-shaped spring seat retainer 168 accommodates the outer ends of a plurality of contact biasing springs 170, which serve to bias the contact fingers 162 radially inwardly into good contacting engagement with the stationary tubular main contact 44.

Figures 4, 5:
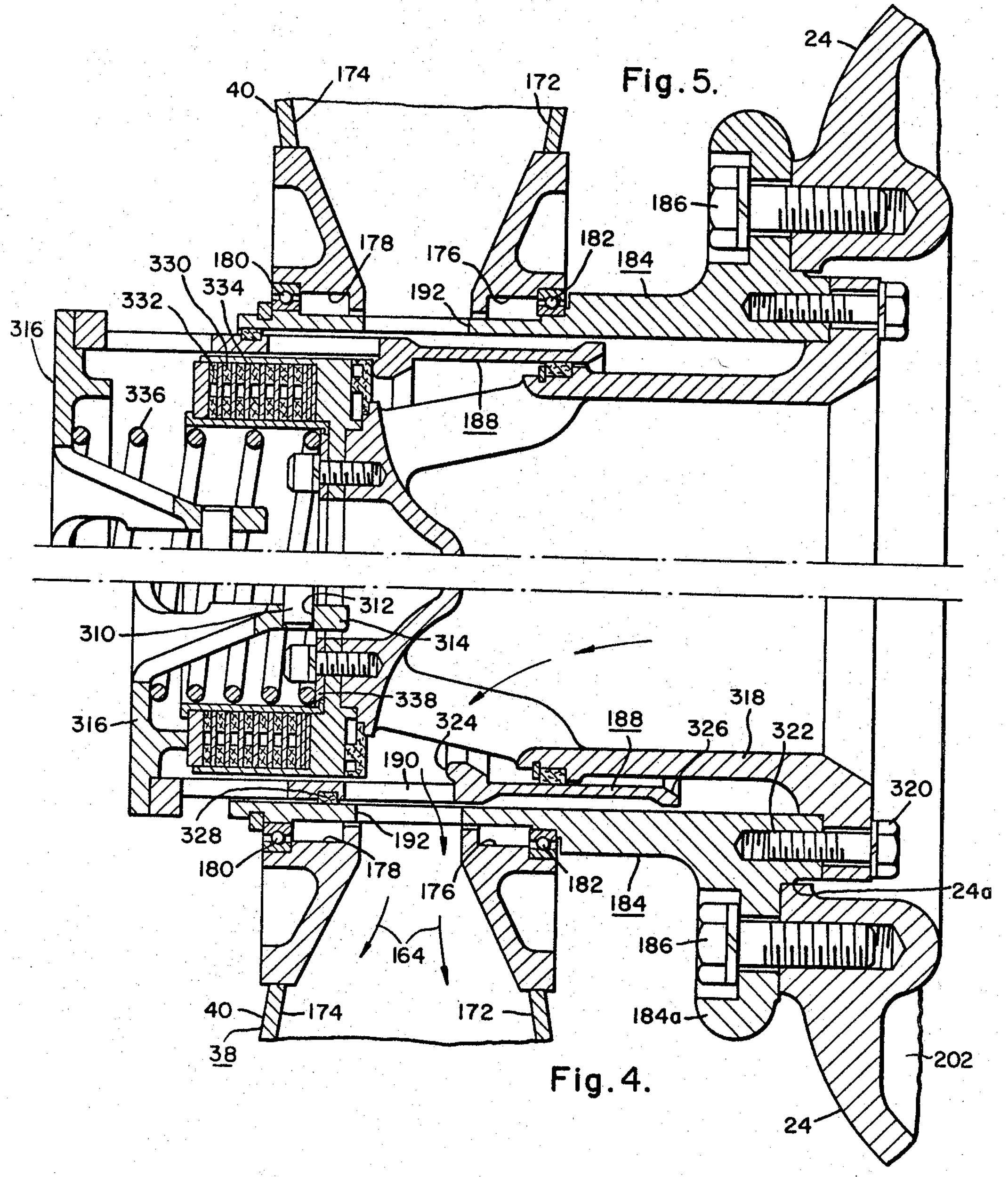
FIG. 4 is an enlarged fragmentary view of the blast-valve showing the open position thereof, taken substantially along the line IV—IV of FIG. 1.
FIG. 5 is a view similar to that of FIG. 4, but showing the blast-valve in the closed position thereof.

As shown more clearly in FIGS. 3–5 of the drawings, the rotatable cross-arm assembly 38 includes a pair of spaced side plates 172, 174 having journal openings 176, 178 provided therein, which, in conjunction with bearings 180, 182 (FIG. 4), serve to rotatably support the cross-arm assembly 38 on an apertured bearing and blast-valve support, generally designated by the reference numeral 184. The apertured bearing support 184, as shown in FIGS. 4 and 5, is fixedly secured by bolts 186 to the auxiliary reservoir chamber 24. During the opening operation, opening of a cylindrically-shaped blast-valve 188, as shown in FIG. 4, will permit the blasting of high-pressure arc-extinguishing gas, such as sulfur-hexafluoride ($SF_6$) gas from the auxiliary gas reservoir 24, out through openings 190 provided in the side-guide wall portion of the blast-valve 188, and through openings 192 provided in the bearing and blast-valve support 184, through the gas-conducting arms 40 and toward the intercontact region to effect extinction of the established arc 46.

Preferably, in order to effect more accurate guiding of the gas blast, an insulating orifice structure 194 is provided, being movable with the movable contact structure 42 to effect a directional flow of the compressed gas through the vented moving and stationary contacts 42, 44, as shown in FIG. 3 of the drawings. In more detail, the orifice structure 194 has a mounting flange portion 196, which is clamped by a clamping ring 198 to the end of each rotating arm 40. Each stationary tubular arcing contact 44 has a plurality of venting slots 200 provided therein to assist in venting of the compressed arc-extinguishing gas 202.

*Blast-valve operating linkage—FIGS. 2, 6*

Figures 12, 13:
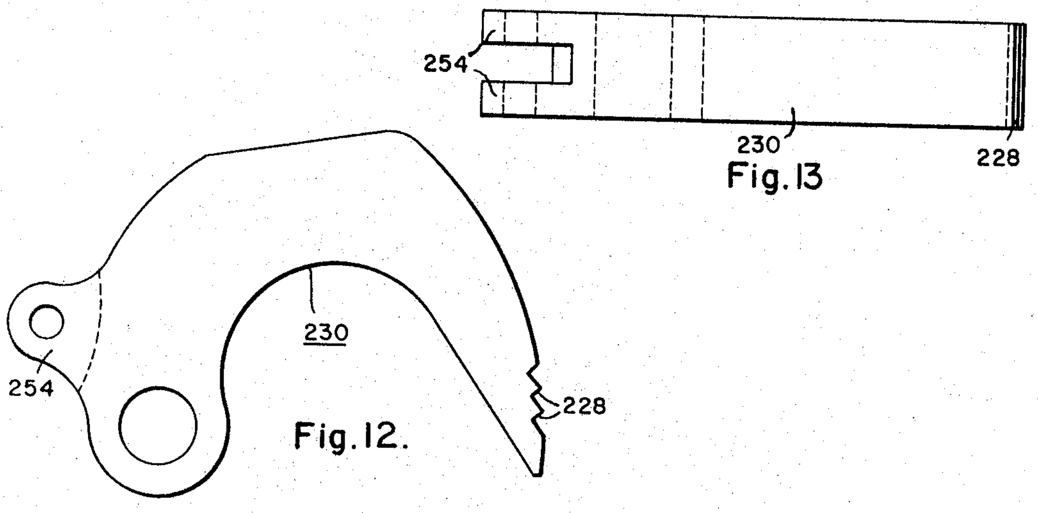
FIG. 12 is an enlarged side elevational view of the blast-valve operating cam.
FIG. 13 is a top plan view of the blast-valve operating cam illustrated in FIG. 12.
Figure 14:
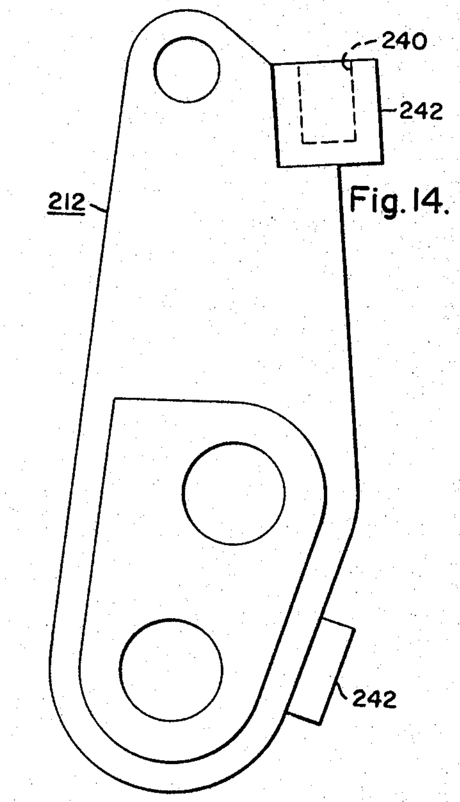
FIG. 14 is a side elevational view of a blast-valve cam-operating lever.
Figure 15:
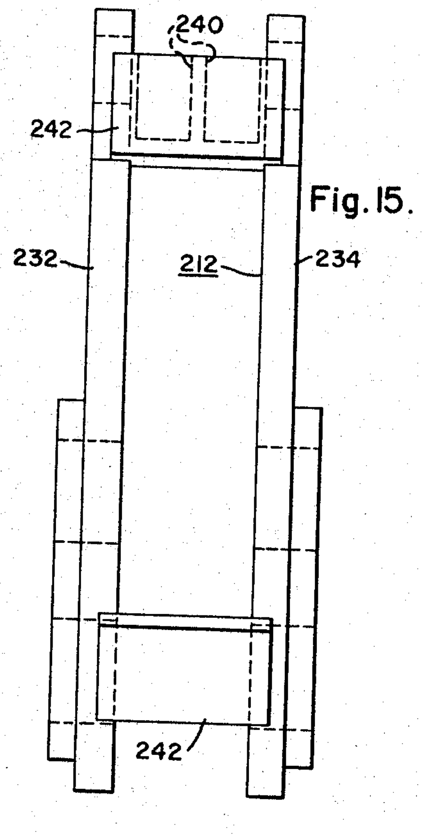
FIG. 15 is a side elevational view of the blast-valve cam-operating lever of FIG. 14.
Figure 18:
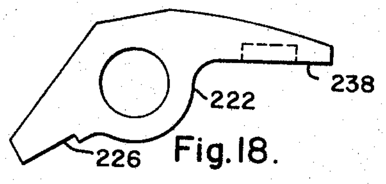
FIG. 18 is a side elevational view of one of the releasable blast-valve dogs.
Figure 19:
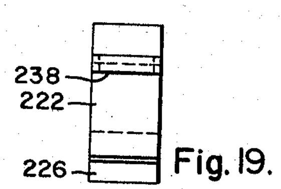
FIG. 19 is an end elevational view of the releasable blast-valve dog of FIG. 18.

The blast-valve operating linkage 204, in general, comprises the cam-actuated blast-valve 188, which functions to open and to permit a blasting of arc-extinguishing gas 202 only during the opening operation of the circuit interrupter 10. As shown more in detail in FIG. 7 of the drawings, the main operating crank-arm assembly 138 has a bifurcated arm portion 138c integrally formed therewith, which is pivotally connected by a pin 206 to a floating link 208, the latter, in turn, being pivotally connected by a pivot pin 210 to a double-armed blast-valve cam-operating lever 212 (FIG. 7 and FIG. 14) stationarily pivotally mounted upon a stationary pivot pin 214. The pivot pin 214 is journaled within upright stationary supports 216, 218 (FIG. 6) welded to the base plate 140 of the main frame support 139. Disposed between the outer ends of the double-armed blast-valve cam-operating lever 212, and pivotally mounted upon a pivot pin 220, is a pair of contiguously disposed operating dogs, or latches 222, 224, which have different-length nose portions 226, which engage with teeth 228 provided at the outer free end of a blast-valve cam 230. The blast-valve cam 230 is shown more clearly in FIGS. 12 and 13 of the drawings, and is also pivotally mounted upon the pivot pin 214 between the furcations 232, 234 of the bifurcated blast-valve cam-operating lever 212. A pair of compression springs 236 (FIG. 7) are provided to bias the tail portions 238 of the operating latches 222, 224 into operating engagement with the teeth 228. In more detail, the compression springs 236 seat within recesses 240 provided in a transverse movable support 242 fixedly secured, as by welding, to the outer free ends of the bifurcated blast-valve cam-operating lever 212, as shown in FIGS. 14 and 15 of the drawings.

During the opening operation, the clockwise opening rotative motion of the main operating lever 138 effects, through straightening of the links 138c, 208, counterclockwise opening motion of the blast-valve cam-operating lever 212, and, as a result, also counterclockwise opening camming motion of the blast-valve cam 230 about the pivot axis 214. This camming action takes place in opposition to the opposing forces exerted by the blast-valve and by a compression spring 244, which seats between an off-jutting bracket portion 246 of the main frame 139 and a spring seat 248 movable with a spring-guide rod assembly 250 (FIG. 7). The spring-guide rod assembly 250 is pivotally connected by a pivot pin 252 to an apertured bifurcated portion 254 of the pivotally-mounted cam 230. The camming action exerted by the blast-valve cam 230 upon a roller assembly 256, carried by a blast-valve operating lever 258, opens the blast-valve by causing clockwise (FIG. 6) motion of the blast-valve operating lever 258, more clearly shown in FIGS. 10 and 11 of the drawings. With reference to FIGS. 14 and 15 of the drawings, the blast-valve operating lever 258 is of webbed construction for strength, and comprises pivot arms 260, 262 having pivot apertures 264 provided therethrough to accommodate a pivot pin 266 journaled in upstanding stationary supports 268, 270 constituting a portion of the main stationary frame 139.

Figures 10, 11:
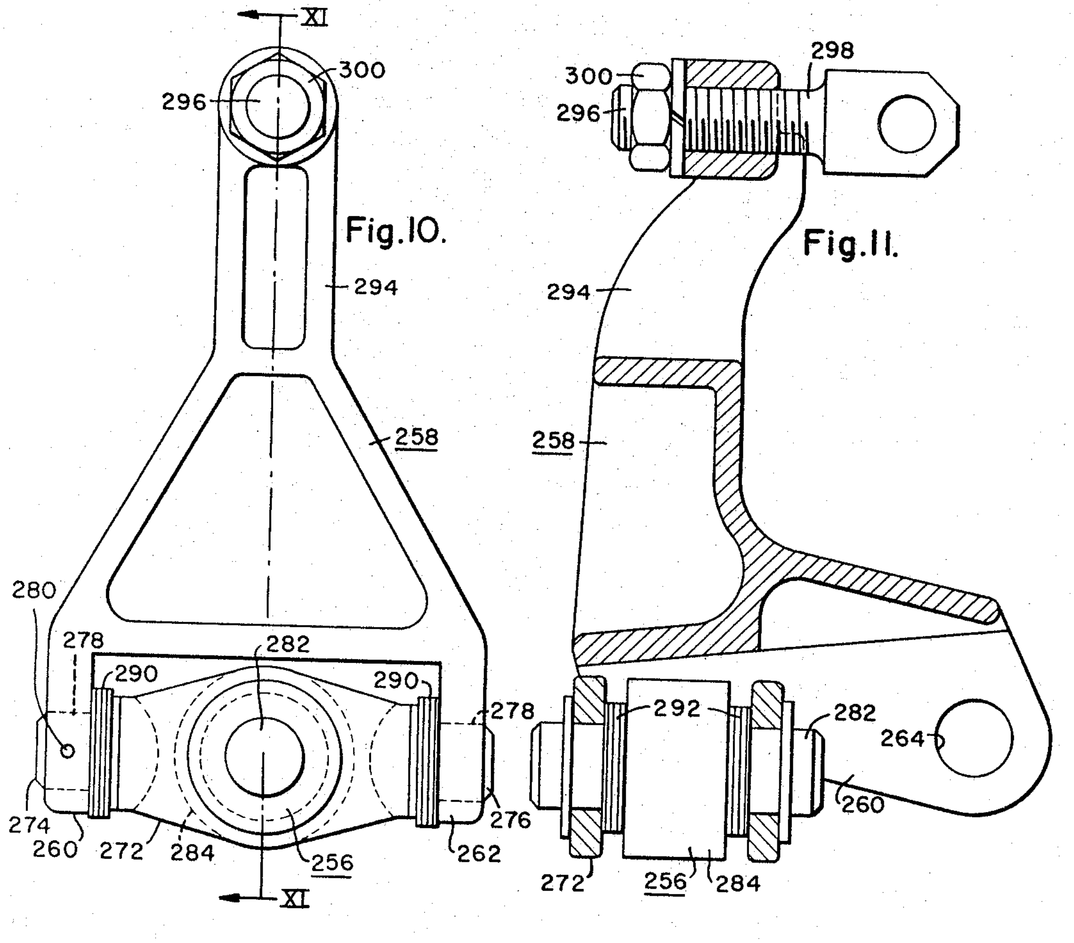
FIG. 10 is a detail front elevational view of the blast-valve operating lever.
FIG. 11 is a vertical sectional view taken substantially along the line XI—XI of the blast-valve operating lever of FIG. 10.
Figure 16:
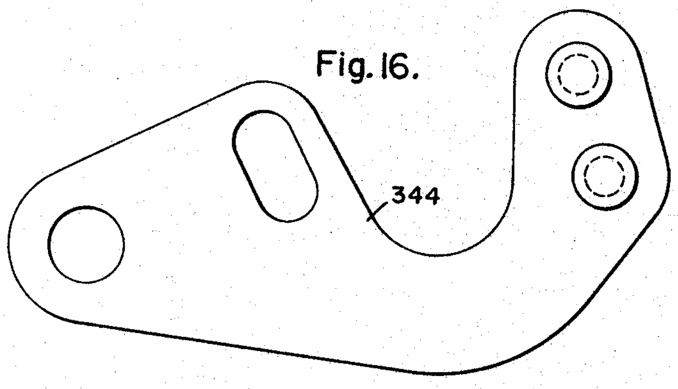
FIG. 16 is a side elevational view of a blast-valve releasing bracket.

The roller assembly 256 includes a trunnion 272 having end stub shafts 274, 276, which are journaled within pivot apertures 278 provided adjacent the ends of the arm portions 260, 262 of blast-valve lever 258 and which are held in place by pins 280 (FIGS. 6 and 10). A roller pin 282 rotatively supports a roller 284 and is journalled in side portions of the trunnion 272. Spacing washers or small roller thrust bearings 290, 292 may be utilized in the assembly. The blast-valve operating lever 258, in addition, has an integral upstanding thrust arm 294, which is suitably apertured and tapped to adjustably receive a stud portion 296 of a blast-valve thrust link 298. A locking nut 300 may be used to lock the adjustment once it is properly made.

As viewed more clearly in FIG. 6, the adjustabe thrust link 298 has an aperture 302 to receive a pivot pin 304 so as to pivotally connect with a floating thrust link 306 having a bifurcated end portion 308. The furcations straddle a thrust pin 310, which extends through apertures 312 provided in a bifurcated portion 314 of a spring seat 316 carried by the cylindrically-shaped blast-valve 188. FIGS. 4 and 5 may be referred to in this connection.

With reference to FIG. 6, it will be observed that the aforesaid camming action during the opening operation causes clockwise rotative motion of the blast-valve lever 258 to effect, through the thrust linkage 298, 306, inward opening movement of the cylindrically-shaped blast-valve 188, to the open position thereof as shown in FIG. 4 of the drawings. A blast of high-pressure arc-extinguishing gas 202 will issue from the auxiliary high-pressure reservoir tank 24 through a stationary directional spider support 318, through the blast-valve openings 190, and through the plurality of openings 192 provided in the bearing support 184, which serves as a spindle for rotative motion of the gas-conducting cross-arm assembly 38. FIGS. 3 and 4 more clearly show the directional path 164 for the gas blast.

With particular reference to FIGS. 4 and 5 of the drawings, it will be noted that the high-pressure auxiliary reservoir tank 24 has an opening 24a associated therewith, around which is clamped a supporting flange 184a integrally formed with the spindle support 184. The stationary support 318 forming part of the blast-valve 188 is secured by a plurality of bolts 320 within tapped holes 322 provided in the flange portion 184a of the spindle support 184. The movable blast-valve 188 has a ring-shaped blast-valve seat portion 324, and, in addition, a guide-sleeve portion 326 having a guide ring 328 provided thereon. To cushion the end of the opening motion of the blast-valve 188, there is provided a cushioned seat 330 comprising a plurality of metallic and resilient rings 332, 334, the resilient rings 332 preferably comprising an elastomeric material, such as rubber. In addition, a closing blast-valve spring 336 is provided, being seated upon a seat portion 338 of the guide support 318 and acting upon the spring seat 316 to bias the blast-valve 188 to the closed position.

Figure 17:
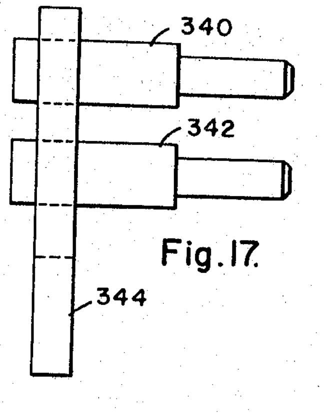
FIG. 17 is an end elevational view of the blast-valve releasing bracket of FIG. 16.

When the circuit-interrupter 10 moves to the closed circuit position, the lever 212 rotating clockwise moves into the position shown in FIG. 7. Toward the end of the closing stroke the dogs 222, 224 drop into notches 228 provided in the cam 230. The two dogs 222, 224 are not identical, one having a slightly longer nose 226 than the other. The difference in length is approximately one-half the distance between two teeth 228 on cam 230 so that when the lever 212 starts to rotate counterclockwise during the opening operation, one or the other of the dogs 222, 224 will engage quickly with the notches 228 in the cam 230. Further movement toward the open position will force the cam 230 against the roller 284 carried by the lever 258 and cause lever 258 to rotate clockwise in the view of FIG. 6. The upper end of this lever 258 carries a link 306, one end of which is slotted, as at 308, and which presses against a pin 310 in the blast-valve 188. Pressure inward on the blast-valve 188 causes it to open. The roller 284 rides upward on the cam 230 until the valve 188 has opened a distance of approximately 1⅜". This permits full flow of the high pressure gas 202 from the reservoir 24 through the blast-valve 188 into the contact arms 40 for the purpose of producing interruption. Further movement of the cam 230 results in no more rise of the roller 284 and no more opening movement of the blast-valve 188. The movement of the cam 230 and the cam-operating lever 212 continues until the trailing ends 238 of the dogs 222, 224 engage with projections 340, 342 carried by a stationary bracket 344 (FIG. 17) adjustably secured by a bolt 346 to the front support 216 of the main frame 139. These projections 340, 342 engage with the tails 238 of the dogs 222, 224 at an adjustable position before the end of the opening stroke, and farther movement of lever 212 causes the tails 238 of the dogs 222, 224 to be pressed against action of the springs 236 so that the noses 226 are withdrawn from the notches 228 in the cam 230. The lever 212 can continue to move with the movement of the main lever 138 until the end position is reached. However, as soon as the dogs 222, 224 are removed from the cam 230, spring 244, which biases the cam 230, will cause it to rotate clockwise. As soon as the roller 284 leaves the section of the cam 230 which is circular with respect to the axis 214, about which the cam 230 rotates, the roller 284 in lever 258 will start to move downward, and the blast-valve 188 will close under the action of springs 336 inside the blast-valve 188. The nut 348 (FIG. 7) is so adjusted that with the valve 188 in the closed position, the cam 230 will be held against the roller 284 in lever 258. The breaker 10 stays in this position until a closing operation is initiated, at which time the lever 138 is rotated counterclockwise thereby driving the lever 212 clockwise and again engaging the dogs 222, 224 with the cam 230.

Figure 8:
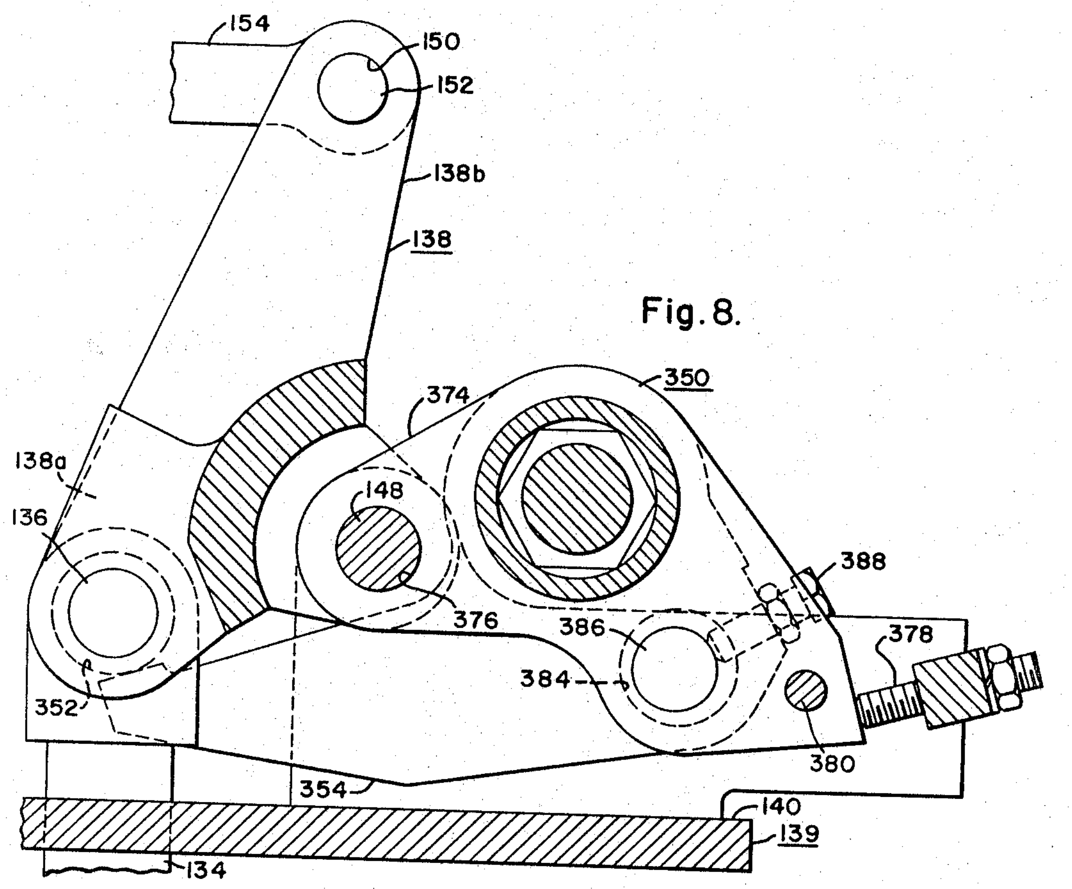
FIG. 8 is an enlarged detailed sectional view of the operating linkage, the view being taken substantially along the line VIII—VIII of FIG. 6.
Figure 9:
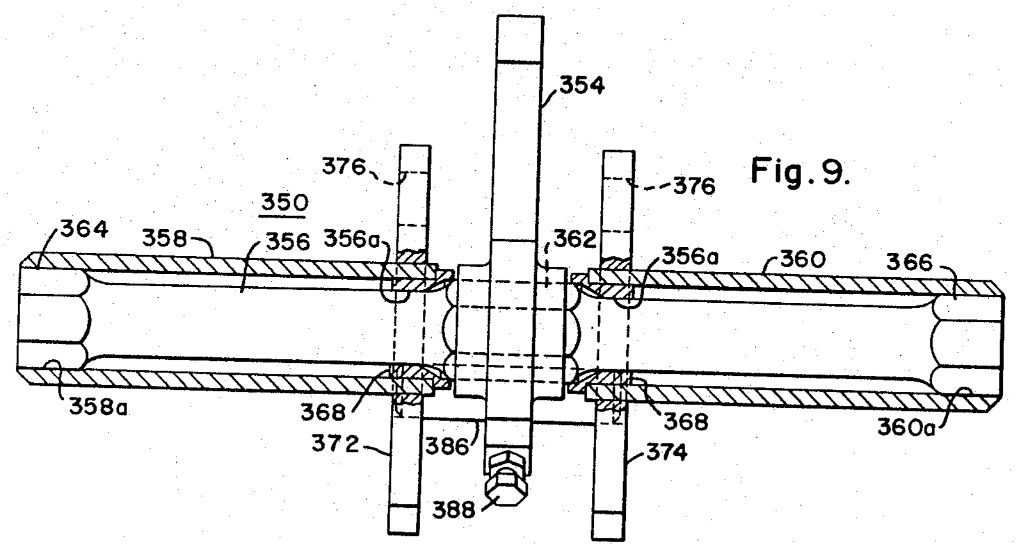
FIG. 9 is a longitudinal sectional view taken through the torsion-bar spring assembly.

*Torsion accelerating spring-bar assemblage—FIGS. 8, 9*

To obtain a high initial accelerating opening force for moving the movable contact assemblage 38 to the open-circuit position, and thereby providing high-speed operation of the breaker 10, there is provided an accelerating-spring torsion-bar assemblage, generally designated by the reference numeral 350, and shown more particularly in FIGS. 8 and 9 of the drawings. This spring 350 is one of the key elements in the interrupting head 28 because it stores the energy for the opening of the contacts 42, 44. Energy is stored in it, by the downward closing movement of the particular operating rod 128, 130 or 132. A roller 352 on pin 136 (FIG. 8) engages a torsion lever 354 about a half inch before the closed position is reached, and deflects the outer end of this lever 354 downwardly. The pin 136 carries the roller 352 between one of the arm portions 138*a* and a third arm portion of the main operating lever 138. This causes a relatively small angular movement in the torsion shaft 356, but this torsion shaft 356 is relatively stiff, and the resisting force at the pin 136 increases from a very low nominal initial load to a final load of approximately 15,000 to 20,000 lbs. Most of the deflection is in the shaft 356. However, a small amount of the deflection does occur in the outer torsion casings or housings 358, 360. The result is that about 85% of the energy is stored in the bar 356, and about 15% in the housings 358, 360.

On a closing stroke, the torque lever 354 is engaged by the roller 352 which, as it moves downwardly twists the spring or shaft 356. The lever 354 fits around a hexagonal section 362 of this shaft 356 at the mid-point thereof. The outer ends 364, 366 of the shaft 356 are also hexagonal and fit into hexagonal holes 358*a*, 360*a* in the tube assemblies 358, 360. The tube assemblies 358, 360 contain bushings 368 in the vicinity of the lever 354, which permit the round sections 356*a* of the shaft 356 to rotate with respect to the torsion-tube housings 358, 360.

The two tube assemblies 358, 360 can be rotated about pin 148 for adjustment of the maximum spring load. In more detail, the torsion bar 356, is supported by the pair of tubular enclosing torsion housings 358, 360 of steel having welded thereto, adjacent the inner ends thereof, relatively stationary support and clamping plates 372, 374. The support plates 372, 374 have holes 376 extending therethrough, which accommodate the main operating shaft 148 of the interrupter-head 28. The torsion assemblage 350, therefore, may rotate about the main pivot shaft 148 of the interrupter head 28, as defined by certain limits as described hereinafter. The clamping plate 372, 374 position is adjustable within only a narrow range by means of the bolt and locking means 378. After adjustment they are held rigidly in the frame assembly 139 by two bolts 380. This movement provides a control of the maximum force exerted by the spring.

In addition, the support plates 372, 374, as shown in FIG. 10, have enlarged apertures 384 provided therethrough to accommodate, with clearances of a fraction of an inch, a stationary pin 386 held in holes in the main frame 139. An adjustable screw 388, extending through the centrally-disposed torsion lever 354, presses against pin 386 to provide an adjustment of the initial torsion, or loading on the torsion-bar assemblage. The set screw 388 usually bears relatively lightly against the pin 386, just enough to take up slack in the motion.

When the breaker is pulled into the closed position, lever 354 is rotated with respect to the housings 358, 360, and the large holes 384 permit the lever 354 to be rotated while the pin 386 remains stationary in the housings 358, 360. How far the pin 386 moves through the holes 384 depends upon how far the lever 354 is rotated by the downward movement of the vertical operating rod 134 and by the position in which the tubular assemblies 358, 360 are held in the frame 139. The pin 386 is not intended as a stop for this spring 350; there should always be clearance at the holes 384.

To insure that the rotative moving contact assemblage 38 will move completely to the fully open-circuit position, there is addittionally supplied a biasing spring assemblage 390 (FIG. 7), comprising a compression spring 392 interposed between a spring seat 394 and a coacting movable spring seat 396, secured by a rod 398 to an operating moving arm 138*e* of the main operating lever 138, as by a pivot pin 402, as more clearly illustrated in FIG. 7 of the drawings. The net result is that during the initial portion of the opening operation, the torsion-bar assemblage 350 provides a high initial opening force, which is buttressed, or augmented by the biasing spring 390 acting through the entire stroke to insure full contact opening.

*Gas-supply system*

Generally, the compressed-gas circuit interrupter 10 of the present invention can be used with any suitable high-pressure gas. Preferably, however, it is desired to use a highly efficient gas, such as sulfur-hexafluoride ($SF_6$) gas 202, which may be at a high pressure of say, for example, 240 p.s.i.g. The exhaust tank pressure, as present within the exhaust housing 28 and within the insulating column structures 22 will be at substantially 45 p.s.i.g. As is usual with such types of interrupters, preferably a compressor, not shown, is supplied to effect recompression of the low-pressure $SF_6$ gas 202 to the requisite high-pressure level, at which it is stored within the tanks 24.

From the foregoing description, it will be apparent that there is provided an improved and simplified type of high-voltage compressed-gas circuit interrupter 10 readily adapted, by use of a modular construction 28, to high-voltage ratings. For a 500 kv. rating, three such modular heads 28 are provided. For higher voltages, additional heads 28 could be provided; for example, 700 kv. might require four heads 28 and correspondingly longer vertical insulating columns 22. 345 kv. breakers may use only two heads 28 on correspondingly shorter insulating columns 22.

The use of the individual interrupting heads 28 thus enables the circuit-interrupting structure 10 to be adaptable to a wide line of voltage ranges say, for example, and not by limitation, from voltages of 345 kv. up to 700 kv., and even higher. It will be noted that the interrupting head-units 28 with the rotating cross-arm assemblages 38 result in an extremely compact construction enabling high-speed operation, such as two-cycle operation, to be achieved with a minimum of inertia of the rotating parts. Gas-flow conditions during interruption are controlled in the most effective manner to result in highly-effective interrupting conditions being brought simultaneously upon the two serially-related arcs 46 established in each of the interrupting head-units 28.

The particular construction utilized results in there being no necessity for employing extremely high compressed-gas pressures, say, for example, 1000 p.s.i., as is necessitated in some circuit-interrupting constructions. In addition, the use of a highly-effective insulating and arc-extinguishing gas 202, such as sulfur-hexafluoride ($SF_6$)

gas enables the spacing distances within the interrupting head-units 28 to be maintained at a minimum, and, in addition, results in fast circuit interruption making two-step switching unnecessary on interruption.

The employment of the accelerating-spring assemblage, as a torsion-bar arrangement 350, results in extremely high initial accelerating opening forces with a minimum of inertia of the utilized parts. Certain features of the circuit interrupter 10, such as the interrupting assemblage 38, closing resistor and broad general positioning of the blast valve 188 within the hub portion of the interrupter are set forth in detail and claimed in United States patent application filed June 12, 1964, Ser. No. 374,708, by Roswell C. Van Sickle, and assigned to the assignee of the instant application.

In conclusion, there results a circuit interrupter 10 of extremely high-speed operation and capable of ready maintenance with a minimum number and weight of moving parts associated with the movable contact assemblage 38. The particular location and arrangement of the compressed-gas blast-valve structure 188 associated with the support spindle or bearing-and-blast-valve support 184 results in a minimum of time necessary for the gas blast 202 to flow into the intercontact region for fast circuit interruption.

It will be noted that in the fully-open circuit position of the interrupter 10, there is an open gap distance between the pairs of separated contacts 42, 44 with no parallel insulation subjected to voltage stress. This fact is extremely important.

Although there has been illustrated and described specific structures, it is to be clearly understood that the same were merely for the purpose of illustration, and that changes and modifications may readily be made therein by those skilled in the art without departing from the spirit and scope of the invention.

We claim as our invention:

1. A compressed-gas circuit interrupter including means defining a gas-reservoir tank, means defining a gas-conducting bearing portion mounted upon said gas-reservoir tank, means defining a pair of spaced stationary contacts, a rotatable bridging contact cross-arm assembly carrying a pair of movable contacts and rotatively supported upon said bearing portion, each movable contact being separable from a relatively stationary contact to establish an arc, blast-valve means movable with respect to said bearing portion to an open position for controlling a flow of high-pressure gas through said bearing portion from said gas-reservoir tank, crank means for driving said bridging contact cross-arm assembly, a blast-valve lever for forcing the opening movement of said blast-valve means, means pivotally supporting said blast-valve lever on a stationary pivot, cam means for effecting rotative opening movement of said blast-valve lever, and releasable means for interconnecting said crank means with said cam means.

2. A compressed-gas circuit interrupter including means defining a gas-reservoir tank, means defining a gas-conducting bearing portion mounted upon said gas-reservoir tank, means defining a pair of spaced stationary contacts, a rotatable bridging contact cross-arm assembly carrying a pair of movable contacts and rotatively supported upon said bearing portion, each movable contact being separable from a relatively stationary contact to establish an arc, blast-valve means movable with respect to said bearing portion to an open position for controlling a flow of high-pressure gas through said bearing portion from said gas-reservoir tank, crank means for driving said bridging contact cross-arm assembly, a blast-valve lever for forcing the opening movement of said blast-valve means, means pivotally supporting said blast-valve lever on a stationary pivot, cam means for effecting rotative opening movement of said blast-valve lever, releasable means for interconnecting said crank means with said cam means, and said releasable means including a pivoted lever carrying a pair of actuating dogs adjacent the outer free end thereof.

3. A circuit interrupter including a substantially closed metallic interrupting casing having a pair of terminal bushings extending therewithin, means defining a gas-reservoir chamber disposed adjacent the central portion of the casing, said gas-reservoir chamber having a protruding gas-conducting bearing portion affixed thereto, a pair of stationary contacts secured to the inner ends of said terminal bushings, a rotative bridging cross-arm contact assembly rotatively supported on said gas-conducting bearing portion and carrying a pair of movable contacts at the outer free ends thereof, said rotative cross-arm assembly having gas-conducting arms, the movable contacts being separable from the stationary contacts to establish a pair of serially-related arcs, a blast-valve disposed internally of said bearing portion for controlling a blast of gas through the gas conducting arms to effect arc extinction, operating means for rotating said rotatable bridging cross-arm contact assembly, a blast-valve lever for forcing said blast-valve to the open position, means pivotally supporting said blast-valve lever on a stationary pivot, cam means for effecting rotative opening movement of said blast-valve lever, and releasable means for interconnecting said operating means with said cam means.

4. A compressed-gas circuit interrupter including separable contact means, operating means for effecting separation of said separable contact means including rotative drive crank means, a high-pressure gas reservoir tank, a blast-valve for controlling the flow of compressed gas out of said tank, a rotatable blast-valve operating lever pivotally mounted on a stationary pivot, a rotatable actuating cam for effecting rotative movement of said pivotally-mounted blast-valve operating lever, said cam having a plurality of spaced teeth adjacent the outer free end thereof, a rotatable blast-valve lever carrying a pair of contiguously-disposed latching dogs adjacent the outer free end thereof and straddling said cam, means connecting said rotative drive crank means with said rotatable blast-valve lever, and releasing means for releasing said latching dogs after a predetermined opening movement of said actuating cam.

5. A circuit interrupter including a relatively stationary contact and a cooperable movable contact separable to establish an arc, operating means positively connected to said movable contact to positively effect the opening and closing movement thereof, first spring means operatively engaging said operating means for accelerating the movable contact to the open position comprising a torsion-bar spring assembly operable over only a limited contact separating movement, means movable with said operating means to engage said first spring means only near the end of the closing stroke for charging said first spring means in the closed-circuit position of the circuit interrupter, and second spring means positively connected to said operating means and including a second independent accelerating spring operable over the entire opening movement of the movable contact.

6. The combination of claim 5, wherein the torsion-bar spring assembly includes an elongated metallic torsion bar having an operating lever affixed adjacent the midpoint thereof, and a pair of torsion-tube housings affixed to the outer ends of the elongated metallic torsion bar and clamped at the inner ends thereof.

7. An accelerating-spring assemblage for a circuit interrupter including an operating lever adaptable for abutment by a portion of the movable contact assemblage of the circuit interrupter near the end of the closing operation, a torsion bar of metallic material and adapted to be twisted, said operating lever being affixed to one portion of said torsion bar to effect a twisting action thereon, means resisting torsional movement of the torsion bar and clamped to another portion of said torsion bar, said operating lever having an enlarged clearance hole provided therein, an adjustable tension and set-screw threaded into said operating lever with the end of the set-screw protruding into the enlarged clearance hole, a stationary adjustment pin extending through said enlarged clearance hole in the operating lever, whereby adjustable abutting engagement between the set-screw and the adjustment pin will determine the initial torsional loading on the torsion bar.

8. An accelerating-spring assemblage for a circuit interrupter including an operating lever adaptable for abutment by a portion of the movable contact assemblage of the circuit interrupter near the end of the closing operation, a torsion bar of metallic material and adapted to be twisted, said operating lever being affixed to the midpoint of said torsion bar, a pair of torsion tubes surrounding the ends of the torsion bar and clamped to the outer extremities of the torsion bar, said operating lever having an enlarged clearance hole provided therein, an adjustable tension and set-screw threaded into said operating lever with the end of the set-screw protruding into the enlarged clearance hole, a stationary adjustment pin extending through said enlarged clearance hole in the operating lever, whereby adjustable abutting engagement between the set-screw and the adjustment pin will determine the initial torsional loading on the torsion bar.

9. In combination, a torsion bar, an operating lever secured adjacent the mid-point of said torsion bar and having an enlarged clearance hole provided therein, an adjustable tension and set-screw threaded into said operating lever with the end of the set screw protruding into the enlarged clearance hole, a pair of torsion-tube assemblages affixed to the outer ends of said torsion bar and including inner stationary clamping plates having apertures therein, a stationary adjustment pin having the ends thereof passing through the apertures in the clamping plates and extending with clearance through the enlarged clearance hole in said operating lever, whereby adjustable abutting engagement between the set screw and the adjustment pin will determine the initial torsional loading on the torsion bar.

10. A circuit interrupter including a relatively stationary contact and a cooperable movable contact separable to establish an arc, means for accelerating the movable contact to the open position comprising a torsion-bar spring assembly operable over only a limited contact separating movement, said torsion-bar spring assembly including a torsion bar, an operating lever secured adjacent the mid-point of said torsion bar and having an enlarged clearance hole provided therein, an adjustable tension and set-screw threaded into said operating lever with the end of the set screw protruding into the enlarged clearance hole, a pair of torsion-tube assemblages affixed to the outer ends of said torsion bar and including inner stationary clamping plates having apertures therein, a stationary adjustment pin having the ends thereof passing through the apertures in the clamping plates and extending with clearance through the enlarged clearance hole in said operating lever, whereby adjustable abutting engagement between the set screw and the adjustment pin will determine the initial torsion loading on the torsion bar, and a second independent accelerating spring operable over the entire opening movement of the movable contact.

11. The compressed-gas circuit interrupter according to claim 1, wherein the rotatable bridging contact cross-arm assembly has hollow gas-conducting arms to transmit a blast of gas radially outwardly from said bearing portion to the region between the separated contacts.

12. The compressed-gas circuit interrupter according to claim 1, wherein the blast-valve means moves longitudinally of the gas-conducting bearing portion.

13. The compressed-gas circuit interrupter according to claim 1, wherein the gas-conducting bearing portion is cylindrical, and the blast-valve means includes a sleeve valve.

14. A compressed-gas circuit interrupter of the gas-circulating type including a substantially closed metallic interrupting exhaust casing having a pair of terminal bushings extending therewithin, means defining a high-pressure gas-reservoir chamber disposed adjacent the central portion of the casing, said high pressure gas-reservoir chamber having a protruding gas-conducting bearing portion affixed thereto, a pair of spaced stationary contacts secured to the inner ends of said terminal bushings, a rotative bridging cross-arm contact assembly rotatively supported on said gas-conducting bearing portion and carrying a pair of movable contacts at the outer free ends thereof, said rotative cross-arm assembly having gas-conducting arms, the movable contacts being separable from the stationary contacts to establish a pair of serially related arcs, a blast-valve disposed internally of said bearing portion for controlling a blast of gas through the gas conducting arms to effect arc extinction, operating means for rotating said rotatable bridging cross-arm contact assembly, a blast-valve lever for forcing said blast-valve to the open position, means pivotally supporting said blast-valve lever on a stationary pivot, cam means for effecting rotative opening movement of said blast-valve lever, and releasable means for interconnecting said operating means with said cam means.

15. A compressed-gas circuit interrupter including means defining a gas-reservoir tank, means defining a gas-conducting bearing portion mounted upon said gas reservoir tank, means defining a pair of spaced stationary contacts, a rotatable bridging contact cross-arm assembly carrying a pair of movable contacts and rotatively supported upon said bearing portion, each movable contact being separable from a relatively stationary contact to establish an arc, blast-valve means movable with respect to said bearing portion to an open position for controlling a flow of high-pressure gas through said bearing portion from said gas-reservoir tank, crank means including a stationary main supporting frame (139) having a crank-arm assembly (138) rotatively supported therein about an axis of rotation, said crank means causing the rotation of said bridging cross-arm assembly to the open and closed position, a blast-valve lever pivotally supported upon said main stationary supporting frame (139) with an axis of rotation generally transversely of the first axis of rotation, said blast-valve lever causing the opening movement of said blast-valve means, cam means rotating about an axis of rotation parallel to said first axis of rotation and linked to said crank-arm assembly (138), and releasable means for interconnecting said crank-arm assembly with said cam means.

16. The compressed-gas circuit interrupter according to claim 1, wherein the cam means includes a pivotally-mounted cam arm (230) having teeth (228) provided adjacent the outer free end thereof, and the releasable means includes a pivotally-mounted blast-valve cam-operating lever having operating dogs supported adjacent the free end thereof to make operative engagement with said teeth.

17. The compressed-gas circuit interrupter according to claim 4, wherein the latching dogs have different-length nose portions (226).

18. A circuit interrupter including a relatively stationary contact and a cooperable movable contact separable to establish an arc, operating means including a crank-arm assembly (138) rotatable about an axis of rotation positively connected to said movable contact to positively effect the opening and closing movement thereof, first spring means operatively engaging said operating means for accelerating the movable contact to the open position comprising a torsion-bar spring assembly pivoted about said axis and operable over only a limited contact separating movement, means movable with said operating means to engage said first spring means only near the end of the closing stroke for charging said first spring means in the closed-circuit position of the circuit interrupter, and second spring means positively connected to said operating means and including a second independent accelerating spring operable over the entire opening movement of the movable contact.

References Cited

UNITED STATES PATENTS

| | | | |
|---|---|---|---|
| 1,807,815 | 6/1931 | White | 200—166 |
| 2,534,621 | 12/1950 | Panhard | 267—1 |

FOREIGN PATENTS

| | | |
|---|---|---|
| 177,674 | 2/1954 | Austria. |
| 700,405 | 12/1953 | Great Britain. |
| 788,604 | 1/1958 | Great Britain. |
| 259,998 | 7/1949 | Switzerland. |

ROBERT K. SCHAEFER, *Primary Examiner.*

ROBERT S. MACON, *Examiner.*